(No Model.) 3 Sheets—Sheet 1.
F. H. RICHARDS.
WEIGHING AND DELIVERING APPARATUS.

No. 600,039. Patented Mar. 1, 1898.

Witnesses:
D. S. Hawkins
Fred. J. Dole

Inventor:
F. H. Richards (No Model.)  3 Sheets—Sheet 2.

F. H. RICHARDS.
WEIGHING AND DELIVERING APPARATUS.

No. 600,039.  Patented Mar. 1, 1898.

Witnesses:
D. S. Hawkins.
Fred. J. Dole.

Inventor:
F. H. Richards.

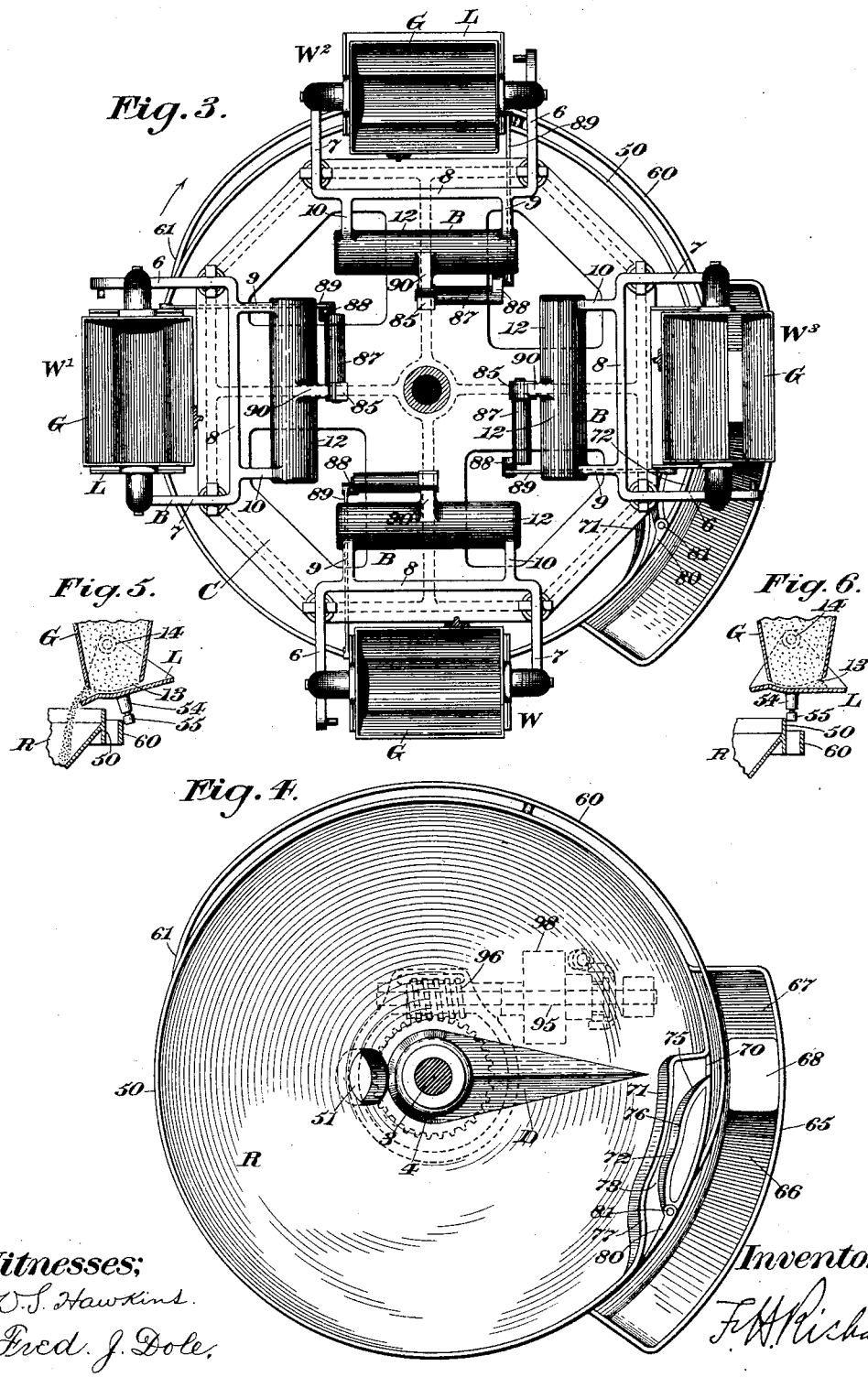

UNITED STATES PATENT OFFICE.

FRANCIS H. RICHARDS, OF HARTFORD, CONNECTICUT.

WEIGHING AND DELIVERING APPARATUS.

SPECIFICATION forming part of Letters Patent No. 600,039, dated March 1, 1898.

Application filed June 15, 1897. Serial No. 640,854. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing and Delivering Apparatus, of which the following is a specification.

This invention relates to weighing and delivering apparatus.

The objects of the invention are to provide weighing mechanism mounted for traveling movement, means for supplying the same with material, and means for effecting the discharge of the weighing mechanism when it reaches a predetermined point, and in the form of the invention illustrated I have represented for the purpose of securing a great amount of work in a given time a plurality of weighing mechanisms supported for traveling movement in an orbital path, said mechanisms being preferably automatically dischargeable at a common point. For the purpose of insuring greater accuracy the respective weighing mechanisms will be preferably overloaded—that is, each is supplied with a quantity of material in excess of the predetermined load, the surplus being removed prior to the discharge of said load and while the weighing mechanism is in transit.

Figure 1:
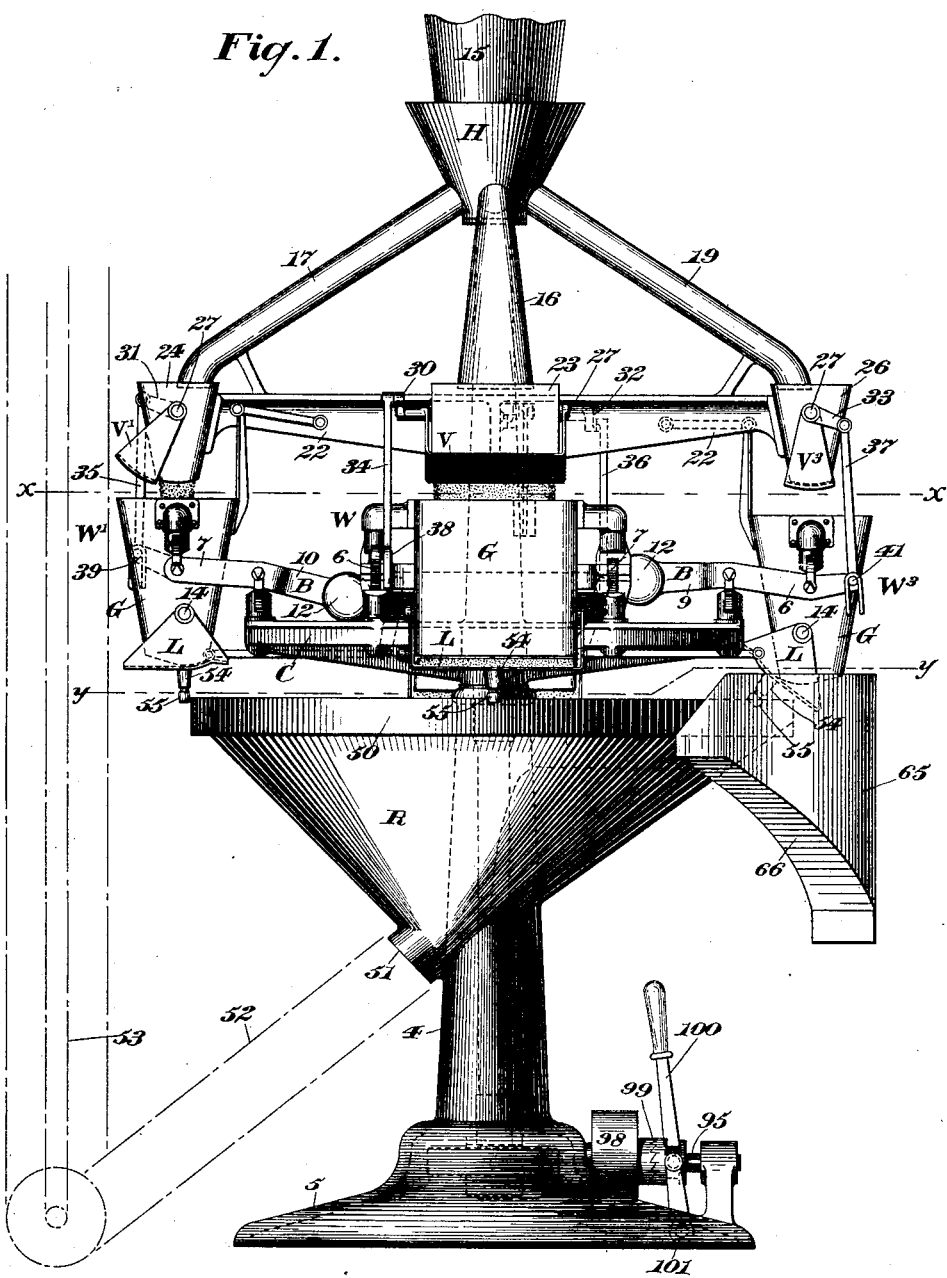
Figure 2:
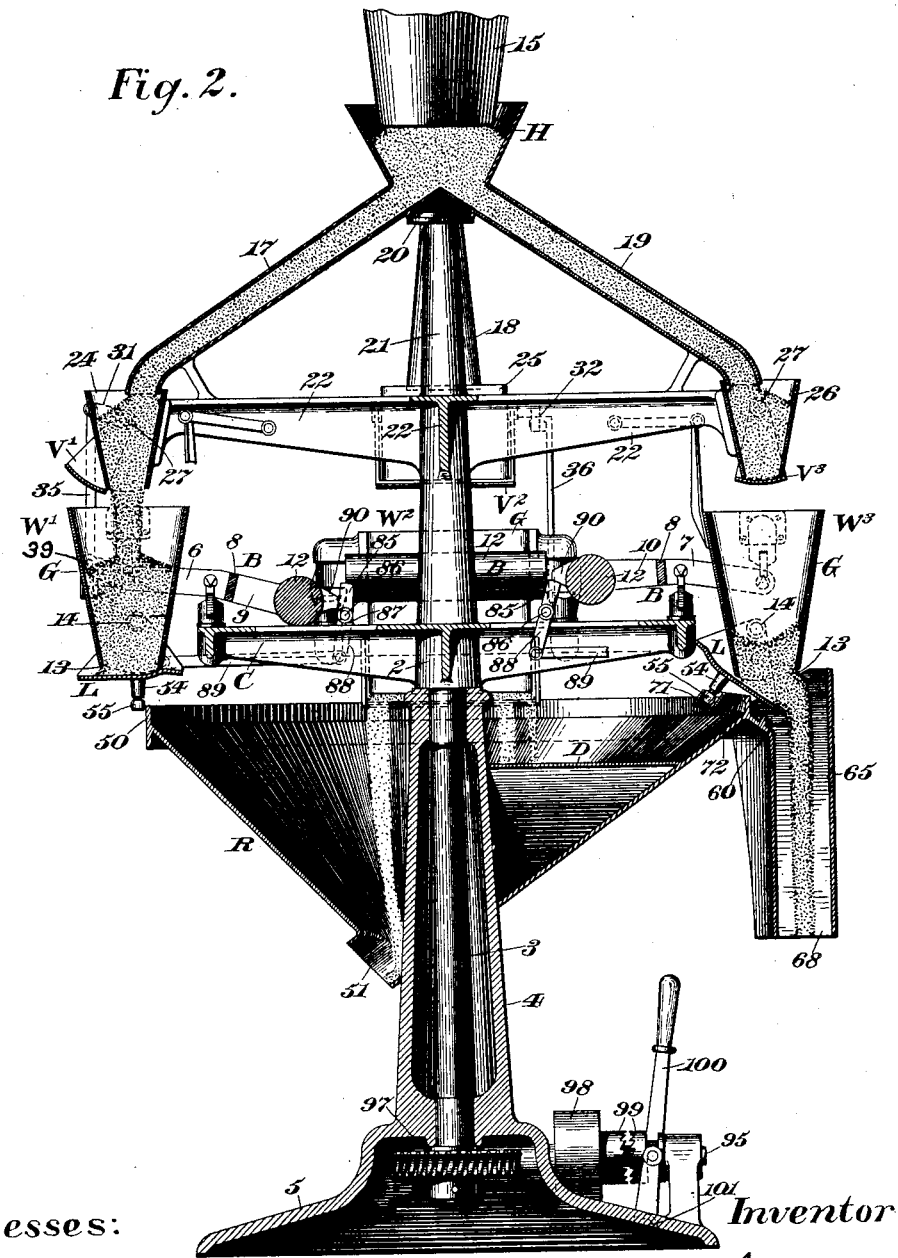

In the drawings accompanying and forming part of this specification, Figure 1 is a side elevation of my improved weighing apparatus. Fig. 2 is a longitudinal central section of the same. Figs. 3 and 4 are sectional plan views taken, respectively, in the lines $x$ $x$ and $y$ $y$, Fig. 1; and Figs. 5 and 6 are detail views in sectional elevation, hereinafter more particularly described.

Similar characters designate like parts in all the figures of the drawings.

My present invention embodies as a part thereof a weighing mechanism or weighing mechanisms, as I have illustrated a plurality thereof.

The weighing mechanisms, which are automatic in their operation, are preferably similar in construction and are designated, respectively, by W, W', $W^2$, and $W^3$, they being mounted in the present case for movement through an orbital or circuitous path, the direction of movement being indicated by the arrow in Fig. 3.

The several weighing mechanisms are supported for traveling movement by the carrier C, which, with the weighing mechanisms, will be hereinafter more particularly specified. The carrier C has centrally thereof the hub 2, which is suitably fixed to the vertical spindle or shaft 3, continuously-operative driving means being preferably furnished to rotate the spindle, and consequently the carrier C and weighing mechanisms. The vertical spindle or shaft 3 is journaled for rotative movement in the standard or post 4, which rises from the base or bed 5, the post and standard constituting a convenient framing for supporting the several parts. The hub or collar 2, which is fixed to the spindle or shaft 3, works against a suitable bearing on the upper face of the stationary post or standard 4, as represented in Fig. 2.

The weighing mechanisms are similar in construction and mode of operation, and this being the case it is deemed necessary to describe but one of them in detail—for example, the weighing mechanism W—similar characters being employed to designate corresponding parts in the other weighing mechanisms of the series.

The weighing mechanism W consists of a load-receiver, as G, and a counterweighted scale-beam, as B, said scale-beam being mounted in the ordinary manner near the outer edge of the carrier or platform C, the latter being in the form of a skeleton platform, the hub 2 of which, as hereinbefore specified, is suitably secured to the shaft 3. The scale-beam B consists of a pair of arms 6 and 7, from which the load-receiver is suspended in a well-known manner, said arms being jointed at the rear by the transverse portion 8, from which projects rearwardly the arms 9 and 10, connected by the counterweight 12.

The load-receiver G is substantially in the shape of a hopper having a discharge-outlet 13, which is normally covered by a suitable closer, as L, constituting in the present instance the load-discharger of the weighing mechanism. The closer L is supported for oscillation, it being pivoted to the load-receiver at 14, its axis of oscillation being located slightly to the rear of a vertical line intersecting the center of the load-receiver, whereby said closer has a tendency to open, this action, however, being properly limited during the loading period.

For the purpose of insuring accuracy in work equal to hand weighing I prefer to overload the respective weighing mechanisms. Each of said weighing mechanisms will be supplied with a quantity of material in excess of or beyond the amount determined upon for a true load or charge, the surplus being preferably removed while the weighing mechanisms are in transit, and any suitable means may be employed for successively overloading and removing the surplus from the several weighing mechanisms.

The supplying or overloading means are preferably movable with the several weighing mechanisms—that is, the latter are overloaded while they are traveling through their path.

A supply-hopper is shown at H, it being adapted to deliver, through suitable conducting means, the necessary amounts of material to the several weighing mechanisms, said hopper being located below the usual supply-pipe 15, a portion of which is shown in Figs. 1 and 2. The supply-hopper H is provided with a series of inclined tubular conduits or pipes 16, 17, 18, and 19, leading, respectively, to the weighing mechanisms W, W', W², and W³. The supply-hopper H is shown frusto-conical in shape, its lower flat end resting on the flat flange or disk 20, secured to the upper end of the longitudinal sleeve 21, surrounding and suitably fixed to the shaft 3 for rotation therewith. The longitudinal sleeve 21 has secured thereto, about midway its length, a series of radial flanged arms, as 22, to the outer ends of which are suitably fixed a series of hoppers located over the several weighing mechanisms. Said hoppers are designated, respectively, by 23, 24, 25, and 26, and are located under the respective supply-conduits 16, 17, 18, and 19 and over the weighing mechanisms W, W', W², and W³, thereby to supply the necessary overloads to the latter.

The valves for the several hoppers are designated, respectively, by V, V', V², and V³, said valves being of the "oscillatory" type and pivoted, as at 27, to the hoppers, said valves being movable below the outlets of the hoppers, to arrest the supply of material therefrom, and being controlled by the respective weighing mechanisms. The valves V, V', V², and V³ are furnished with crank-arms 30, 31, 32, and 33, to which are pivoted the rods 34, 35, 36, and 37, bifurcated at their lower ends, the bifurcations straddling the projections 38, 39, 40, and 41 on the arms 6 of the several scale-beams.

The operation of the weighing mechanism is as follows: In Figs. 1 and 2 the valve V' of the weighing mechanism W' is illustrated as in its wide-open position, the weight 12 of the beam B resting on the carrier or platform C. The closer L of the load-receiver G is illustrated as shut and the load-receiver as partially filled with material. When a certain quantity of material has been added to that already in the load-receiver G of the weighing mechanism W', said load-receiver will descend, the poising end of the beam B moving in a corresponding direction, and the projection 39, by falling away from the rod 35, will permit the valve V' to close. The several valves are self-closing, they having a preponderance of weight below their axes to effect this operation. When the load-receiver G has been overloaded, it will descend to the limit of its downstroke, and it will be evident that during this period of the operation the weighing mechanism and supply means therefor have been moved in unison in their orbital path, the overload being supplied while the weighing mechanism is in motion.

In Fig. 2 the weighing mechanism W², or the load-receiver G thereof, is represented as having reached the limit of its downward movement, the surplus or overcharge being withdrawn at this stage.

It will be understood that the surplus is removed from the several weighing mechanisms while they are traveling about their path, and a suitable surplus-receiver will be provided to catch the surplus prior to the discharge of their loads. The surplus-receiver in the present case consists of a hopper, as R, having a circular rim 50. The surplus receiver or hopper R surrounds and is suitably secured to the standard or post 4, it having in its lower side the discharge outlet or opening 51, through which the surplus, passing down the inclined wall of the receiver, gravitates into the conduit 52 and to the elevating apparatus 53, to be reconducted to the supply-hopper H, the discharge-conduit 52 and elevating apparatus 53 being represented by dotted lines in Fig. 1.

It will be remembered that the closers L are self operative or opening, and means will be provided for holding them in their shut positions during the supply of material thereto, and the circular rim or track 50 constitutes a convenient device for this purpose, said closers having the projections or studs 54 on the under side thereof terminating in rolls 55, which normally run in contact with the outer face of the circular track or rim 50, as represented in Figs. 1 and 2. The closers are oppositely dischargeable, and it will be apparent that when the rolls 55 are in contact with the track 50, as shown in Fig. 2, the opening of the closers will be prevented.

The respective weighing mechanisms will when empty occupy about the position in which the weighing mechanism W is shown in Fig. 3, they being successively overloaded as they rotate, and at predetermined points the supply-valves will be closed, and subsequent to this stage the closers L will be successively opened to effect the removal of the surplus from the load-receivers, the closers L being oppositely dischargable to accomplish this result. The closers are held against forward opening movement by the circular rim or track 50, and at predetermined points they will be rearwardly opened to discharge a portion of the contents or the surplus into the receiver or hopper R.

For controlling or regulating the movements of the closers successively effective means are provided, the track or rim 50 constituting one of the agents for accomplishing this purpose, and a suitable device in a different vertical plane than the track disposed in the path of movement of the weighing mechanisms being provided to open the closers rearwardly as they successively pass a predetermined point. The device for effecting the opening of the closers to permit the surplus to pass from the load-receivers is situated in the path of movement of the several weighing mechanisms; and it consists, preferably, of a horizontally-disposed elongated cam 60, suitably fixed to the circular track or rim 50 and located in the path of movement of the projections 54 of the closers, whereby, as the said projections impinge against the cam on the movement of the several weighing mechanisms, the cam 60 will cause the several closers as they come in contact therewith to open, as represented in Fig. 5, so that the surplus from each weighing mechanism can gravitate from the load-receivers into the receiver or hopper R. The track 50 and cam 60, which constitute controlling devices for the closers, are of different widths, the cam 60 being made narrower than the track 50 and its upper edge being set below the upper edge of the track (see Figs. 5 and 6) for a purpose that will now appear.

The weighing mechanisms W and W' are shown in Fig. 1 as being at the limit of their ascending movements, the projections 54 on the closers L thereof being in contact with the outer face of the track 50 near the upper edge thereof. As the two weighing mechanisms rotate with the carrier C they will be caused to descend, reaching their lowest positions when the two receivers are overloaded, the roll 55 of the projections 54 having when the weighing mechanisms are overloaded passed to a point on the track below the upper edge of the cam 60. On the continuation of the rotative movement of the two weighing mechanisms the roll 55 of the first mechanism will ride against the entering end 61 of the cam, which is eccentric to the track 50, so that the closer L will be swung open as the roll rides along the cam, thereby permitting the surplus to pass from the load-receiver and into the receptacle R, (see Figs. 2 and 5,) one of the rolls being shown in contact with the cam 60 in said Fig. 5.

As soon as the material gravitates from the load-receiver from which it is being withdrawn the load-receiver will rise, but the roll will remain in contact with the cam so long as there is any excess in the load-receiver.

As soon as the surplus has been fully withdrawn the roll will pass to a point above the upper edge of the cam, as shown in Fig. 6, so that the closer may instantly shut off its own weight, thereby to stop the further removal of material from the load-receiver. When the closer has reached its shut position, the roll 55 will abut against the track 50, and at a subsequent point in the travel of the weighing mechanism the load will be discharged, as will hereinafter appear.

The normal mode of operation is, first, the overloading of each weighing mechanism; second, the removal of the surplus at a predetermined point in the path of movement of the weighing mechanism, and, third, the discharge of the predetermined load.

The weighing mechanisms are successively dischargeable automatically and preferably at a common point, the load-receivers G emptying their contents into the discharge hopper or trough 65, located at one side of the surplus-receiver R, and the oppositely-inclined walls 66 and 67 of which lead to the discharge-outlet 68, beneath which may be placed suitable receptacles (not shown) to receive the charges.

The rim 50, as will be evident, constitutes a means for locking or holding the closer of each weighing mechanism in its shut position, and the cam 60 acts as a suitable actuator for swinging each closer open and for holding it in the open position for a sufficient length of time to effect the removal of the surplus from a weighing mechanism, which passes into the receiver or hopper R, and when the rolls 55 have passed above the upper edge of the cam 60, thereby indicating the completion of each load, said loads can be discharged by suitable means, a form of which will now be described.

The circular rim or track 50 is intersected at a suitable point by the recess 70. When a projection 54 or the roll 55 thereof reaches a point above the cam 60, it will be understood that the load in the weighing mechanism from which said projection extends is completed. On the withdrawal of the surplus the weighing mechanism will continue to rotate, and when the projection 54 has reached a point opposite the recess the result will be to release the closer L thereof, which instantly swings open, as indicated in Fig. 2, thereby permitting the load to discharge into the hopper or trough 65, the projection 54 passing into the recess 70 until its further motion is arrested by a suitable device, such as the cam-strip 71, on the inside of the rim 50, which, with a companion cam-strip 72, extends laterally from the recess 70 to form a camway or guideway 73, between which the projection or projections 54 of the several weighing mechanisms are guided as the weighing mechanisms discharge their loads. The cam 72 constitutes a means for locking the respective closers in their open positions, as shown by the weighing mechanism W³, Fig. 2. As each roll 55 reaches a point opposite the notch or recess 70 the closer which carries the same will be released and will swing open to discharge the contents of a load-receiver into the trough 65, and said roll will ride along the convex portion 75 of the cam as the weighing mechanism moves, whereby it will be caused to open and be maintained in such position while rolling along the plane portion 76 of the cam, and when said roll reaches a point opposite the convexity 77 of the cam 71 said convex portion will cause the closer to shut slowly, the companion cam 72, adjacent to the convexity 77, being of such shape as to permit this operation. As soon as each roll passes out of contact with the cam 72 it will engage the curved track 50 and the closer carrying the same will be thereby maintained in its shut position.

Means are provided for preventing the premature discharge of the weighing mechanism or mechanisms, and for this purpose the actuator or cam 60 is made of such length as to extend across the notch or recess 70. When a projection 54 of any one of the weighing mechanisms is opposite the notch or recess 70, it will be evident that the closer on which the same is mounted will be released, provided, of course, the surplus has been fully withdrawn from the proper weighing mechanism.

It will be remembered that when the surplus is fully withdrawn from a load-receiver the projection 54 on the closer L thereof will ascend to a point above the upper edge of the cam 60, so that if the surplus has not been fully withdrawn from the weighing mechanism when a projection 54 thereof is opposite the recess 70 the cam 60 will positively block the action of the closer at this point and prevent its being opened until the surplus is withdrawn, which will take place when the projection has again passed in contact with the cam and when it reaches a point opposite the notch or recess 70 on a succeeding rotation.

For the purpose of preventing the closer L from swinging inward when the projection 54 thereon reaches a point opposite the leaving end of the camway 73 said leaving end is closed by a switch 80, pivoted at 81, near one end of the cam 72, its free end normally abutting against the companion cam 71, as illustrated in Fig. 4. When a projection 54 is about to pass out of the camway, it will strike the switch 80 and force it to one side, this operation being carried out by each of the succeeding weighing mechanisms. If, however, a projection 54 should not enter the camway, but should travel in contact with the cam 60, and subsequently with the rim 50, indicating the fact that the surplus has not been withdrawn from the load-receiver thereof, said projection will strike the switch 80 and force it to its normal position, (illustrated in Fig. 1,) the switch closing the leaving end of the camway 73, and thereby acting as a device to block the opening of the closer, as will be apparent.

Means will be preferably provided for locking each weighing mechanism against movement on the discharge of a load, whereby the load-receiver and the poising end of the scale-beam thereof are held in their lower positions and the valve is also maintained shut, and the locking means in the present case are coöperative, respectively, with the scale-beam and the load-discharger, said locking means being operated by a closer to block the action of the scale-beam. The beam locking or blocking means and the mode of operation thereof being the same in the case of each weighing mechanism, it is unnecessary to describe but one of said means in detail, corresponding parts in the other mechanisms being designated by similar characters.

Attention is called to Figs. 2 and 3. The beam-locker is designated by 85, it being oscillatory and consisting of an arm fixed to the rock-shaft 86, journaled in a longitudinal bearing 87 on the carrier C, the opposite end of said shaft having the rock-arm 88 connected by a link 89 with the closer L. The weight 12 of the scale-beam B is furnished with the projection 90, under which the locker or arm 85 is swung on the discharge of a load, as indicated in Fig. 2, so that the weight 12 will be held against return movement, and the load-receiver G will be retained in its lowermost position, it being apparent also that the valve V³ cannot be opened, as its action is controlled by the scale-beam.

When the closer L of the weighing mechanism W³ or any other of the series is swung open, the beam B being at the limit of its shifting movement, the link 89 will be thrust rearward, thereby swinging the arm 85 under the projection 90 of the scale-beam, as shown in Fig. 2, so as to prevent the return movement of the several parts of the weighing mechanism, it being apparent also that the load-discharger or closer L is locked or held positively in its open position by the cam 72. The projection 90 on the scale-beam is in the nature of a locking device for maintaining the load-receiver against movement in one direction. It will be seen on an inspection of the left-hand side of Figs. 2 and 3 that when the scale-beam B is in its primary position the outside face of the projection 90 will be in contact with the adjacent face of the locker 85, so that the closer L cannot be swung to the rear as long as this relation exists. When, however, the load-receiver G has received its overload, the projection 90 will have been carried to a point above the upper edge of the locker or arm 85, as illustrated in the right-hand side of said figures, so that the closer will be released. Hence it will be evident that reciprocally-effective locking devices are provided operative with the scale-beam and the load-discharger whereby they are held positively in certain positions, as set forth.

The carrier or platform C is continuously driven, it being rotated through the intervention of suitable instrumentalities, such as worm-gearing, at a comparatively slow rate of speed to allow a sufficient length of time to complete the weighing operations of the several mechanisms. The base or bed 5 of the apparatus suitably supports for rotation the driving-shaft 95, having at its inner end the screw 96, meshing with the worm-gear 97, suitably secured to the vertical shaft or spindle, the shaft 95 carrying the driving-pulley 98, which may be coupled to and uncoupled from the shaft 95, when occasion demands, by a suitable clutch, as 99, the usual movable or slidable member of which is connected with the shifting-lever 100 in some suitable manner, said lever being pivotally mounted, as at 101, on the base and being hand-operated, so as to stop and start the apparatus when desired. When the members of the clutch 99 are coupled and the pulley 98 is in rotation, the shaft 3 will be driven to cause the rotative movement of the carrier C and the weighing mechanisms mounted thereon, together with the stream-supplying or overloading means of each weighing mechanism.

The receiver or hopper R has therein a deflector, such as D, which is of wedge shape, the apex thereof being uppermost, so that if any of the surplus should be removed from any one of the weighing mechanisms when it is near the recess or notch 70 such material will strike the upper edge of the device D, and the oppositely-inclined portions thereof will deflect the same toward the outlet 51 to be disposed of in the manner hereinbefore set forth.

The operation of the weighing mechanisms has been hereinbefore described. They are first overloaded and then the surplus is removed, subsequent to which the predetermined loads are discharged into the trough or hopper 65, and when the closers have been successively released by the cam 72 they will shut, thereby releasing the beams, so that the weighing mechanism will be returned to its initial position to repeat the weighing operation. When the closers are shut and the rolls 55 are against any part of the circular rim or track 50, the empty load-receiver, and consequently the poising side of the beams, will ascend, the beams as they rise thrusting the respective rods 34, 35, 36, and 37 upward at the proper stages, whereby the valves V, V', V², and V³ will be opened.

It is to be understood that I do not limit the invention to any particular number of weighing mechanisms. It is perfectly apparent that only one or a greater number can be provided, as these are simply matters of choice or convenience.

Having described my invention, I claim—

1. The combination, with a carrier, of a plurality of weighing mechanisms on said carrier and each including a load-receiver; means for imparting a traveling movement to said carrier; means for supplying an overload of material to each load-receiver; means for automatically causing the several load-receivers, while in transit, successively to discharge the surplus or overload; and means in position successively to discharge the several loads at a common point after the surplus has been removed from the load-receivers.

2. The combination, with a plurality of weighing mechanisms mounted for traveling movement and each including a load-receiver having a closer, of means for successively opening said closers to permit the discharge of the surplus or overload; and means for releasing said closers to permit the same to open to discharge the weighed loads.

3. The combination, with a plurality of weighing mechanisms each including a load-receiver having a closer, of a carrier for said weighing mechanisms; means for imparting a traveling movement to said carrier; means for supplying an overload of material to the load-receivers; means for automatically actuating the closers in succession while the weighing mechanisms are in transit, first to discharge the surplus or overload, and finally to discharge the true load; and a surplus-receiving hopper common to all of the load-receivers.

4. The combination, with a platform, of means for imparting a traveling movement thereto; weighing mechanism mounted upon the platform; means for supplying an overload of material to the weighing mechanism; and means set in operation automatically by the platform while in transit, for effecting the removal of the surplus from the weighing mechanism and for subsequently discharging the true load.

5. The combination, with overloading means, of weighing mechanisms; a movable carrier on which the same is mounted; means for automatically causing the discharge of the surplus or overload; and means for permitting the discharge of the weighed load when the weighing mechanism reaches a predetermined point.

6. The combination, with weighing mechanisms each including an oscillatory load-discharger supported to deliver material in opposite directions, of a carrier for supporting said weighing mechanisms; means for imparting a traveling movement to the carrier; means for supplying overloads to the weighing mechanisms; means for operating the several load-dischargers in succession during the travel of the weighing mechanisms in opposite directions successively to effect first the removal of the surplus, and then to discharge the load; and surplus-receiving and load-receiving hoppers common to all of the weighing mechanisms.

7. The combination, with a plurality of weighing mechanisms supported for traveling movement and each including a load-receiver having a pivoted closer to cover the discharge-outlet thereof, of means for successively supplying overloads to the several load-receivers; means for successively operating each closer during the travel of each weighing mechanism in opposite directions first to discharge the surplus, and then to discharge the completed loads; and surplus-receiving and load-receiving hoppers common to all of the weighing mechanisms.

8. The combination, with weighing mechanism supported for traveling movement, said mechanism including a load-discharger provided with a projection, of a track coextensive with the path of movement of said mechanism with which said projection runs in contact, said track operating to prevent the load-discharger from releasing the load.

9. The combination, with weighing mechanism supported for traveling movement and including a load-discharger provided with a projection, of a track with which said projection runs in contact, said track being coextensive with the path of movement of said mechanism and normally preventing the action of the load-discharger; and means disposed in the path of movement of the projection for engaging the same at a predetermined point in the path of travel of the weighing mechanism, to thereby operate the load-discharger.

10. The combination of weighing mechanism mounted for traveling movement and including a load-discharger, and means for causing said load-discharger to empty a load at a predetermined stage in the movement of the weighing mechanism and for locking the same in such position during the discharge of the load.

11. The combination of weighing mechanism mounted for traveling movement and including a load-receiver provided with a closer, and means for causing an opening movement of said closer at a predetermined stage in the travel of the weighing mechanism and for locking the same in such position for a predetermined length of time.

12. The combination of weighing mechanism mounted for traveling movement and including a load-discharger; means for overloading the weighing mechanism and for subsequently removing the surplus therefrom; and means for causing the said load-discharger to empty the load at a predetermined stage in the movement of the weighing mechanism and for locking the same in such position during the discharge of the load.

13. The combination, with weighing mechanism mounted for traveling movement and including a load-discharger provided with a projection, of a track with which the projection is adapted to run in contact, and a series of cams disposed in the path of movement of said projection and adapted to engage the same at successive points in the path traveled by the weighing mechanism, said cams operating first to cause the load-discharger to discharge a portion of the load and finally to discharge the entire load.

14. The combination of weighing mechanism mounted for traveling movement and including a load-discharger provided with a projection; a track with which the projection is adapted to run in contact, said track having a recess; and a cam secured to the inside of the track, adjacent to the recess.

15. The combination of weighing mechanism mounted for traveling movement and including a load-discharger provided with a projection; a track with which the projection is adapted to run in contact, said track having a recess; and a pair of cams secured to the inside of the track, adjacent to the recess.

16. The combination of weighing mechanism mounted for traveling movement and including a load-discharger provided with a projection; a track with which the projection is adapted to run in contact; a camway disposed in the path of movement of said projection; and a switch normally closing one end of the camway.

17. The combination of weighing mechanism mounted for traveling movement and including a load-discharger provided with a projection; a track with which the projection is adapted to run in contact, said track having a recess; a pair of cams extending laterally from the recess and adapted to form a guideway between which said projection is adapted to travel as the weighing mechanism moves; and a pivotally-supported switch normally closing one end of said guideway.

18. The combination, with weighing mechanism supported for traveling movement and including a load-discharger, of devices disposed in different planes in the path of movement of the load-discharger, to cause the same to operate first to discharge a portion of the load and finally the entire load.

19. The combination of weighing mechanism including a load-discharger provided with a projection, the weighing mechanism being supported for traveling movement; a track in contact with which said projection is adapted to run; and a cam disposed in the path of said projection and of narrower width than the track.

20. The combination of a load-receiver having a closer; a supporting scale-beam for the load-receiver; and means operative on the discharge of a load, and connected with said closer, for blocking the action of the beam.

21. The combination of weighing mechanism; means for causing the discharge of a load; a locking device; means for operating the locking device whereby it is caused to block the action of the weighing mechanism on the discharge of a load; and a coöperating device on the weighing mechanism, located to block the action of the other locking device for a predetermined length of time.

22. The combination of a scale-beam; a load-receiver supported thereby having a closer; and a beam-locking arm connected with the closer and adapted to block the action of the beam on the opening of the closer, to discharge a load.

23. The combination of a load-receiver having a closer; a supporting scale-beam for the load-receiver; a shaft carrying a beam-locking arm; a second arm secured to said shaft; and a link connected, respectively, with said second arm and with the closer.

24. The combination, with weighing mechanism mounted for traveling movement and including a load-receiver, of means for removing different portions of the material from the load-receiver at successive places in the travel of the weighing mechanism.

25. The combination, with weighing mechanism mounted for traveling movement, of overloading means therefor; means for removing the surplus at one place in the transit of the weighing mechanism; and successively operative and independent means for effecting the removal of the remainder of the material at a different place in the travel of the weighing mechanism.

26. The combination, with weighing mechanism, of a carrier therefor; means for imparting a continuous traveling movement to the carrier; overloading means for the weighing mechanism; means for removing the surplus at one place in the transit of the weighing mechanism; and successively-operative means for effecting the removal of the remainder of the material at a different place and during the travel of the weighing mechanism.

27. The combination, with weighing mechanism mounted for traveling movement, of overloading means, and successively-effective means mounted on the framework for effecting the removal of the surplus and the true load, respectively, at different places in the travel of the weighing mechanism.

FRANCIS H. RICHARDS.

Witnesses:
   F. N. CHASE,
   ANDREW FERGUSON.